US006003779A

United States Patent [19]

Robidoux

[11] Patent Number: 6,003,779

[45] Date of Patent: Dec. 21, 1999

[54] POWDER COATING APPLICATION GUN AND METHOD FOR USING SAME

[75] Inventor: Mark Alan Robidoux, Coatesville, Pa.

[73] Assignee: The Eastwood Company, Malvern, Pa.

[21] Appl. No.: 09/063,483

[22] Filed: Apr. 20, 1998

Related U.S. Application Data

[63] Continuation-in-part of application No. 08/956,508, Oct. 23, 1997, Pat. No. 5,850,976.

[51] Int. Cl.[6] .............................. A01G 23/10; B05B 5/25

[52] U.S. Cl. ................................................ 239/3; 239/690

[58] Field of Search .................................... 239/690, 697, 239/698, 704–708, 650, 654, 310, 318, 325, 368, 506, 513, 525, 526, 3

[56] References Cited

U.S. PATENT DOCUMENTS

| | | | |
|---|---|---|---|
| 3,937,101 | 2/1976 | Luderer et al. . | |
| 4,079,894 | 3/1978 | Harjar et al. . | |
| 4,143,819 | 3/1979 | Hastings . | |
| 4,241,880 | 12/1980 | Hastings | 239/691 |
| 4,312,262 | 1/1982 | Tye . | |
| 4,325,911 | 4/1982 | Vincent . | |
| 4,380,320 | 4/1983 | Hollstein et al. . | |
| 4,529,131 | 7/1985 | Rutz . | |
| 4,543,274 | 9/1985 | Mulder . | |
| 4,580,727 | 4/1986 | Moos . | |
| 4,630,777 | 12/1986 | Hollstein et al. . | |
| 4,706,890 | 11/1987 | Talacko . | |
| 4,747,546 | 5/1988 | Talacko . | |
| 4,774,102 | 9/1988 | Kiefer et al. . | |
| 4,828,185 | 5/1989 | Rese | 239/698 |
| 4,852,810 | 8/1989 | Behr et al. . | |
| 4,886,215 | 12/1989 | Ruud . | |
| 4,921,172 | 5/1990 | Belmain et al. . | |
| 5,056,720 | 10/1991 | Crum et al. . | |
| 5,395,046 | 3/1995 | Knobbe et al. . | |
| 5,402,940 | 4/1995 | Haller et al. . | |
| 5,622,313 | 4/1997 | Lader et al. . | |
| 5,850,976 | 12/1998 | Robidoux | 239/698 |

FOREIGN PATENT DOCUMENTS

| | | |
|---|---|---|
| WO 88/10152 | 12/1988 | WIPO . |
| WO 91/07232 | 5/1991 | WIPO . |

*Primary Examiner*—Andres Kashnikow
*Assistant Examiner*—Lisa Ann Douglas
*Attorney, Agent, or Firm*—Duane, Morris & Heckscher, LLP

[57] ABSTRACT

A spray gun for applying powder to coat a work piece uses triboelectric and optionally a corona discharge electrode to charge powder particles electrostatically. The gun communicates with a source of pressurized air through a handle with an air valve controlling flow of the air. Powder in a container in fluid communication with the air flow is fluidized and entrained when the valve is opened. A nozzle with an internal surface defining a passageway to an open end communicates with the powder container. The internal surface of the nozzle frictionally imparts a net electrical charge of a first polarity to part of the powder by frictional contact during spraying. A plurality of discrete tubes are disposed in the central passageway and impart a net electrical charge of a second polarity to another part of the powder due to frictional contact as that part flows around and through the tubes. The powder then exits the nozzle, passes the corona discharge electrode which produces a corona that charges the powder with an electrical potential in the range from about 8 kV to about 20 kV. A perforated disk is disposed at the open end of the nozzle to provide for an even dispersal of powder on the target object to be coated.

20 Claims, 4 Drawing Sheets

POWDER COATING APPLICATION GUN AND METHOD FOR USING SAME

CROSS REFERENCE TO RELATED APPLICATION

This is a continuation-in-part application of application Ser. No. 08/956,508, filed Oct. 23, 1997 now U.S. Pat. No. 5,850,976.

BACKGROUND OF THE INVENTION

1. Field of the Invention

The invention generally relates to powder coating application systems, and more particularly to apparatus and methods that fluidize and deliver powder and use electrostatic charge to assist in adhering powder coatings to work pieces.

2. Background of the Invention

Electrostatic powder spray guns are known for use in applying protective coatings to industrial and commercial products. Typically, a finely divided powder is transported through a spray head while entrained in an air or gaseous stream that is discharged from the spray head. The entrained powder is directed by the spray head toward a target article or work piece and is drawn toward the article or work piece by opposite electrostatic charges (at least effectively) on the powder and on the work piece. After the work piece has been coated with the charged powder, the article is heated. The powder melts and flows together to bond and form a more permanently adhered coating as it cools.

Electrostatic powder spray guns as described are well known in the art. Examples are disclosed in U.S. Pat. No. 4,079,894—Harjar, et al.; U.S. Pat. No. 4,143,819—Hastings; U.S. Pat. No. 4,380,320—Hollstein, et al.; U.S. Pat. No. 4,529,131—Rutz; U.S. Pat. No. 4,543,274—Mulder; U.S. Pat. No. 4,580,727—Moos; U.S. Pat. No. 4,630,777—Hollstein, et al.; U.S. Pat. No. 4,706,890—Talacko; U.S. Pat. No. 4,747,546—Talacko; 4,886,215—Ruud; U.S. Pat. No. 5,056,720—Crum, et al.; U.S. Pat. No. 5,395,046—Knobbe, et al.; U.S. Pat. No. 5,402,940—Haller, et al.; and U.S. Pat. No. 5,622,313—Lader, et al. These patents teach various apparatus, methods, and systems for the electrostatic application of powder coatings to a work piece, and are hereby incorporated herein by reference.

Conventional electrostatic powder coating apparatus typically comprise a spray gun that charges the powder in one of two ways. In one type of device, the gun has a high voltage charging electrode which produces a corona that charges the powder as powder particles move through the corona. Voltages in the range from about 30 to about 100 kilovolts (kV) are typically applied to the electrode in this type of spray gun. Gas propellant pressures in the range of 30 to 70 pounds per square inch (psi) or more are often required as well. While such guns are suitable for many industrial applications, they can be difficult and/or expensive to operate. Additionally, the high voltages and gas pressures required for satisfactory operation make these devices potentially dangerous, particularly for casual users such as small shops and home hobbyists.

In a second type of known device, the gun charges the powder by friction, i.e., triboelectrically, the electrostatic effect produced by rubbing a nonconductive article such as an inflated rubber balloon against certain fabrics. In triboelectric electrostatic spray guns, contact surfaces along the discharge path of the spray gun are constructed from an electrically insulating material, typically a polymer. During spraying, the finely divided powder particles are caused to impact the contact surfaces numerous times and thereby become frictionally charged. High voltage is not required, but propellant gas pressures in the range of 30 to 70 psi or more are often required to produce the necessary frictional contact to effectively charge the sprayed powder. For example, in U.S. Pat. No. 4,886,215—Ruud, also incorporated, a hand-held powder spray gun is disclosed that includes a casing enclosing a plurality of helical charging ducts mounted on parallel cores. The ducts receive the powder from a diffuser mounted in a depending gun handle and discharge charged powder toward a nozzle mounted at one end of the casing. The helical paths increase the length of the ducts and the extent of frictional contact as compared to a straighter path.

An undesirable consequence of the triboelectric interaction between the powder and the contact surfaces of the gun is the creation of a charge on the contact surfaces that is opposite in polarity to that imparted to the powder particles. This effect reduces the efficiency of the gun, and has resulted in various attempts in the art to control or reduce the build up of charge on the gun's contact surfaces. Thus, in U.S. Pat. No. 4,706,890—Talacko, a spray gun is disclosed which contains a discharge electrode disposed entirely outside the region where the powder flows and in electrical communication with the gas flowing in a gas conduit. The powder is accelerated, by pressurized gas, through an annularly shaped and axially extending channel in which the coating material is electrically charged by friction. The channel is defined between inner and outer members formed from different electrically insulating materials. Unwanted charge that builds up on the inner and outer members is discharged to the electrode through the flowing gas.

In U.S. Pat. No. 5,402,940—Haller, et al., a triboelectric powder spray gun is disclosed including a diffuser for mixing powder with a conveying gas, a charging portion located downstream from the diffuser, and a spray head at the outlet of the charging portion for dispensing the charged powder. Haller discloses contact surfaces capable of triboelectrically charging the powder as it transits the gun. Haller recognizes that the electrically insulating contact surfaces become charged opposite in polarity to the charge of the transiting powder and therefore provides a grounding ring, disposed in electrical contact with the charging surfaces, for providing a conduction path to ground for the charge that builds up on the contact surfaces.

In U.S. Pat. No. 5,622,313—Lader, et al., a triboelectric powder spray gun is disclosed in which a charge is imparted triboelectrically to the powder by repeated impacts of the powder with internal contact surfaces formed from electrically insulating materials such as PTFE or polyamide. Lader et al. increase the charging effectiveness of their gun by using an electrode disposed within the gun barrel to produce a corona treatment of the contact surfaces to discharge the contact surfaces and eliminate the need for adjacent ground pathways within the powder flow path.

There is an unsatisfied need for a powder spray gun that can be operated without the application of any voltages, or at relatively low applied voltages, for charging the powder. There is also a need for a powder spray gun that may be operated at relatively low air pressures. There is also a need for a gun mounted powder container that holds a sufficient amount of powder and fluidizes the powder internal to the cup. These improvements would render the spray gun inexpensive, safe, portable and would allow for quick change of powder color. Such a spray gun would be especially suitable for use by small shops and home hobbyists.

SUMMARY OF THE INVENTION

The present invention provides, in its broadest aspects, a gun for spraying a powder onto a work piece to form a coating, a source of the powder and pressurized air or gas, and structures for manipulating the gun and controlling the flow from the pressurized source through the gun. A powder container is generally gun mounted (i.e., coupled to at least one of the handle grip and the nozzle) and is disposed in fluid communication with a controlling valve. A supply of powder is held and fluidized in the powder container by air from the pressurized source in response to operation of the controlling valve, for example a manual trigger valve. A flow path is defined through the gun and has an internal surface and an open end. The powder container is releasably fastened to the gun and is also disposed in fluid communication with the flow path. The internal surface of the flow path frictionally imparts a net electrical charge of a first polarity to a first portion of the powder when the first portion of the powder contacts the internal surface during spraying. A plurality of discrete members are disposed along the flow path and impart a net electrical charge of a second polarity to a second portion of the powder when the second portion of the powder exits the nozzle. As charged powder particles approach and impinge on the work piece they are attracted by the difference in electrical potential causing the powder to adhere.

In one embodiment of the invention, a gun for spraying a powder onto a work piece to form a coating is provided comprising a handle grip including a trigger actuated manual air valve connected to a source of pressurized air and a gun mounted powder container disposed in fluid communication with the air valve. The powder is fluidized by air flow from the source of pressurized air when the valve is actuated. A nozzle is provided having an internal surface defining a central passageway with an open end and in fluid communication with the powder container. The internal surface of the nozzle frictionally imparts a net electrical charge of a first polarity to a portion of the powder when the powder contacts the internal surface during spraying. A plurality of discrete tubes are disposed within the central passageway and impart a net electrical charge of a second polarity to other particles of the powder that flow around and through the tubes during spraying. Advantageously, a support is disposed at the open end of the central passageway and a deflector is removably fastened to the support. The deflector comprises a disk having a plurality of bores defined therethrough.

According to another inventive aspect, an electrode can be disposed within the central passageway of the gun so that a portion of the electrode projects outwardly from the open end of the nozzle. The portion of the electode that projects from the open end is adapted to support a perforated deflector. The other end of the electrode is connected to a source of electrical potential, for example in the range from about 1 kV to about 30 kV.

It has been determined that energizing the electrode during spraying is optional. Energizing the electrode provides an added electrical charge to the powder particles as they transit the gun toward the work piece. This promotes increase powder transfer efficiency (i.e., the ratio of powder sprayed verses the powder adhered to workpiece). However, the users may find it desirable use the non-electrified embodiment of the invention for safety reasons and/or in order to simplify setup time at a sacrifice of transfer efficiency.

BRIEF DESCRIPTION OF THE DRAWINGS

These and other features and advantages of the invention are more fully disclosed or rendered apparent from the following description of certain preferred embodiments of the invention, which are to be considered together with the accompanying drawings wherein like numbers refer to like parts and further wherein.

DETAILED DESCRIPTION OF THE PREFERRED EMBODIMENT

Figure 1:
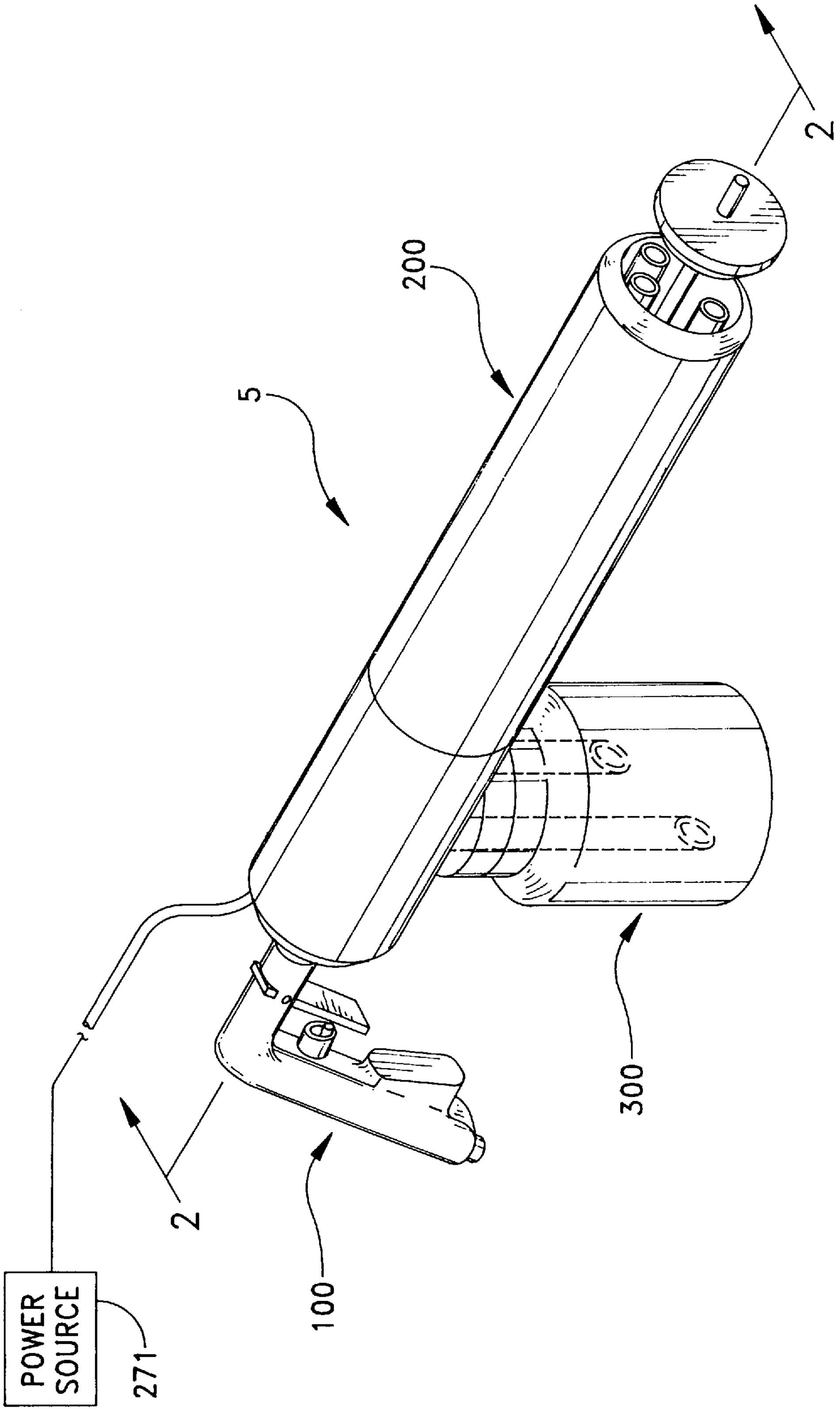
FIG. 1 is a perspective view of a powder application gun formed in accordance with the present invention.

Referring to FIG. 1, a powder application gun 5 according to the invention comprises a handle assembly 100, a barrel assembly 200, and a powder container assembly 300. More particularly, handle assembly 100 comprises a conventional hand-held pneumatic nozzle including a hand grip 110, an air valve 120, a trigger 130 and an orifice tube 140. A connector 145 at the bottom of hand grip 110 is provided for interconnection with a source of pressurized gas, e.g., relatively dry and clean compressed air or the like, by means of a flexible hose (not shown). Air valve 120 is typically suitable for use with air supply pressures in a range from about five to about twelve psi. It will be appreciated that this embodiment is intended to be gripped and aimed manually, but other base configurations are possible, including automatically aimed or stationary devices, machine controlled devices, etc.

Figure 2:
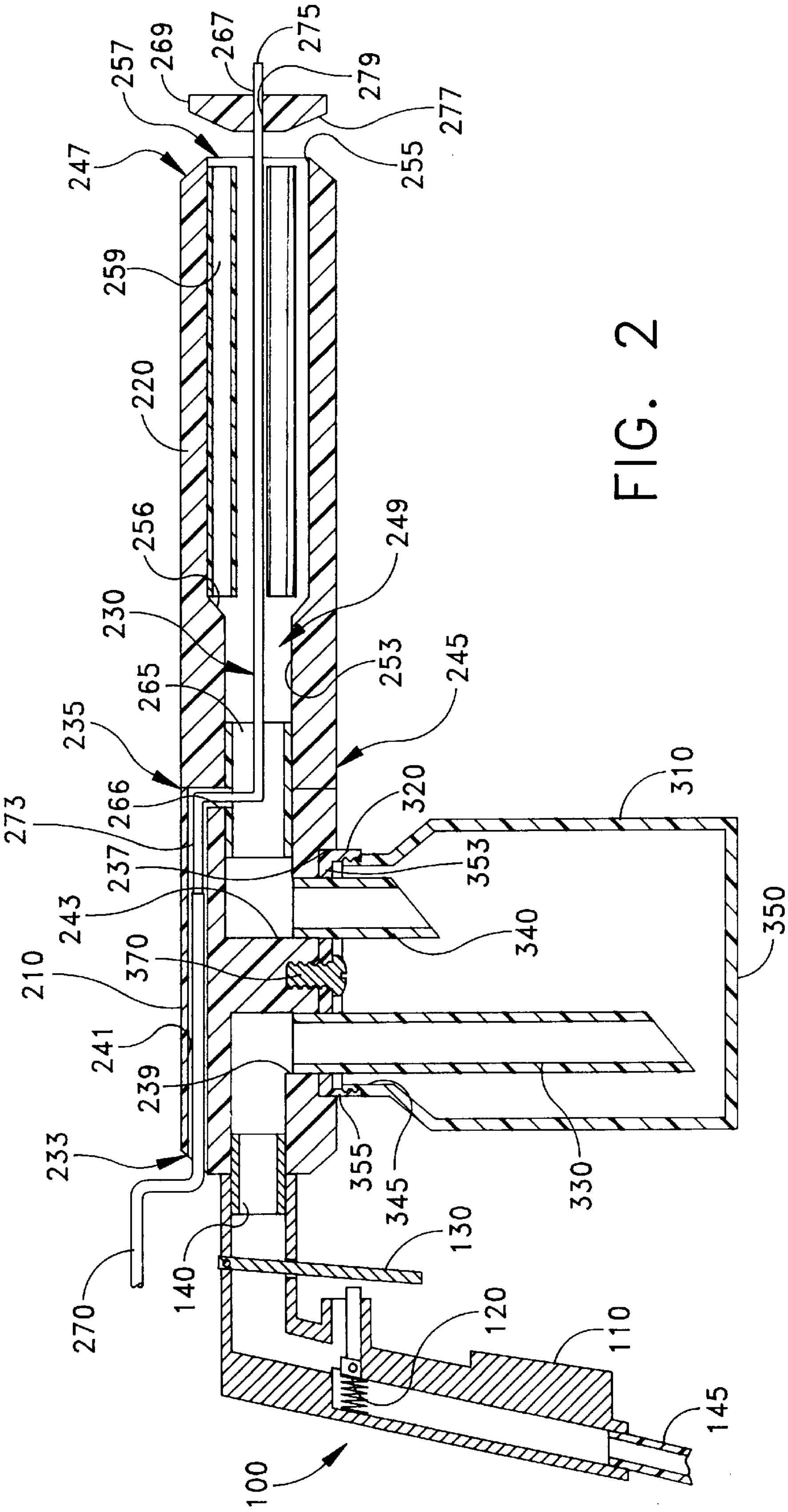
FIG. 2 is a cross-sectional view of the powder application gun shown in FIG. 1.

Referring to FIGS. 1 and 2, barrel assembly 200 comprises a transfer tube 210 and a nozzle 220. Barrel assembly 200 is formed from an electrically insulating material, e.g., polyamide (nylon) or the like. Nylon exhibits strong positive polarity triboelectric charging properties. Thus powders that exhibit a strong negative triboelectric charging tendency, e.g., PTFE, polyester, etc., can be used with barrel assembly 200 with good results. The powders are preferably thermoset or thermoplastic and after coating are melted to bond the powder coating, which can contain pigments.

Transfer tube 210 has a substantially cylindrical cross-section, and includes a proximal end 233, and distal end 235, and a recessed side portion 237. Transfer tube 210 is separable from nozzle 220 to ease assembly of barrel assembly 200, as is discussed in further detail below. A first passageway 239 extends from proximal end 233, through transfer tube 210 and opens onto recessed side portion 237. A cable conduit 241 extends from proximal end 233, through transfer tube 210, and opens onto distal end 235. A second passageway 243 extends from distal end 235, through transfer tube 210, and opens into recessed side portion 237.

Nozzle 220 defines a substantially cylindrical cross-section having an outside diameter substantially equal to that of transfer tube 210. Nozzle 220 includes a proximal end 245, a distal end 247, and a central passageway 249. Central passageway 249 comprises two sections having different inside diameters. Smaller diameter section 253 is disposed in fluid communication with second passageway 243 of transfer tube 210. The larger diameter section of nozzle 220 comprises a triboelectric discharge chamber 255. An annular shoulder 256 is formed at the intersection of smaller diameter section 253 and discharge chamber 255. Central passageway 249 defines an opening 257 in distal end 247 of nozzle 220.

A plurality of discrete elongate members 259 are disposed within triboelectric discharge chamber 255 of nozzle 220. Each of elongate members 259 preferably comprise a tubular shaft that is no longer in length than discharge chamber 255. Elongate members 259 preferably comprise a length and diameter that allows for at least three such members to be disposed within discharge chamber 255 during assembly and operation of powder application gun 5. Advantageously, members 259 are separate from, and relatively loosely assembled within, discharge chamber 255. It will be understood that members 259 may have various cross-sectional shapes and, while not preferred, may be solid as shown at 260 in FIG. 3 or semi-solid in form. Members 259 can be formed from an electrically insulating material, such as polytetrafluoroethylene (PTFE) or the like, which exhibits strong negative-polarity triboelectric charging properties, i.e., opposite to the positive polarity of the nylon of barrel assembly 200. Powders that exhibit a strong positive triboelectric charging tendency, e.g., nylon, some epoxy materials, etc., can also be used with the invention with good results; however using materials that are all of the same polarity may build up a net charge that advantageously is dissipated by other means as mentioned in the prior art discussion above.

In the embodiment of the invention disclosed in FIG. 2, an emitter assembly 230 is included that comprises a sleeve 265, a conductive rod 267, and a powder deflector 269. More particularly, sleeve 265 is sized and shaped to be received within smaller diameter section 253 of central passageway 249, and is formed from an electrically insulating material, e.g., nylon. A central bore is defined through sleeve 265, and is sized and shaped to allow for maximum gas flow through central passageway 249. A side bore through sleeve 265 is provided for accepting a portion of conductive rod 267.

Conductive rod 267 comprises a proximal end 273 and a distal end 275, and is typically formed from 304L stainless steel or the like. Proximal end 273 extends through the side bore in sleeve 265 and is formed so as to allow conductive rod 267 to be disposed in coaxial-relation with central passageway 249 of nozzle 220. A preferably insulated cable 270 is electrically coupled to proximal end 273 of conductive rod 267. Cable 270 is disposed within cable conduit 241, extends through transfer tube 210, and exits barrel assembly 200 from proximal end 233. Cable 270 is interconnected to a source of electrical potential or power source 271, such as an inverter capable of supplying a predetermined DC electrical potential in the range from about 1 kV to about 30 kV, or more, as required for the particular coating operation. Suitable high voltage, low current power supplies capable of supplying an electrical potential in this range are known in the art.

Figure 3:
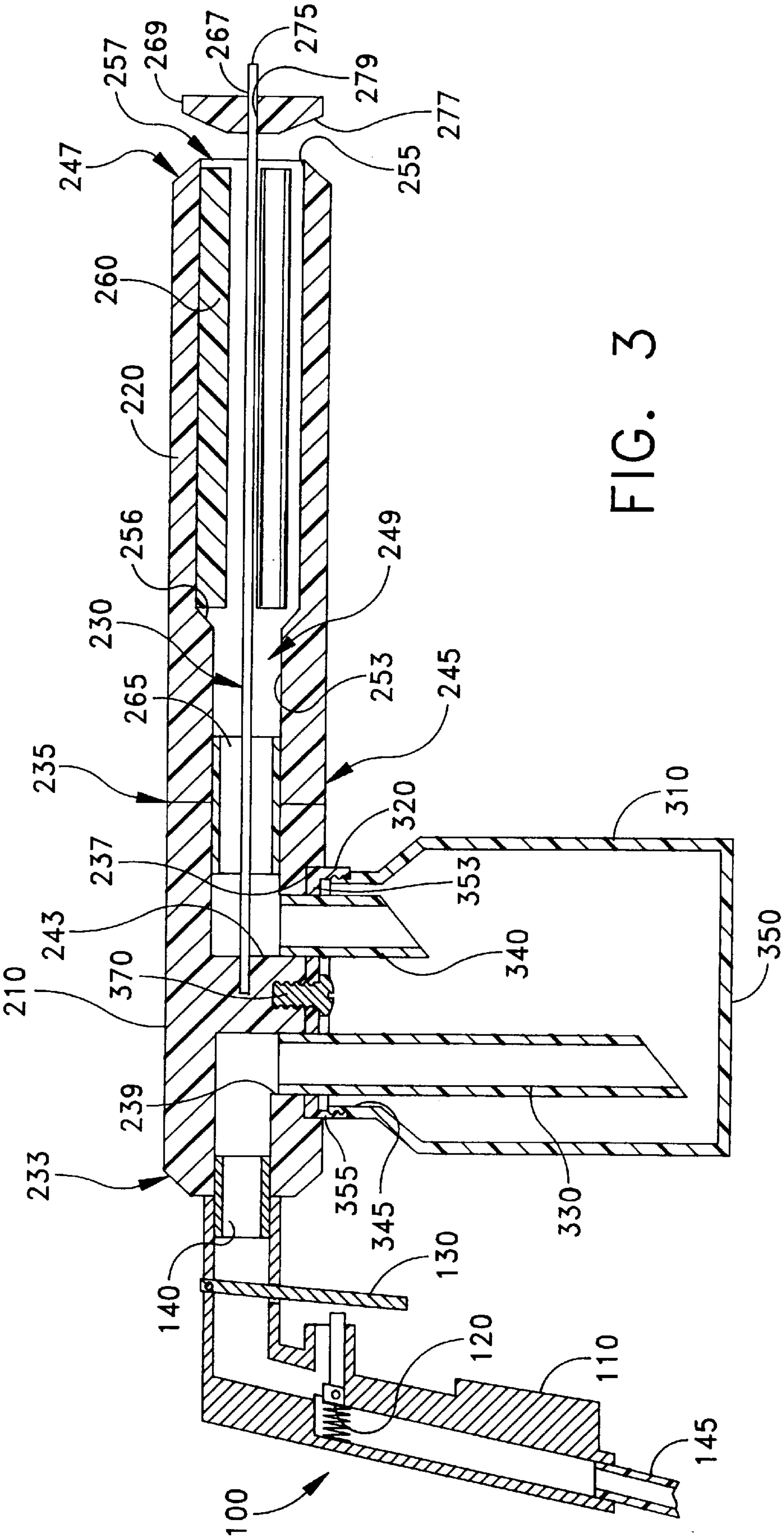
FIG. 3 is a cross-sectional view of a powder application gun formed in accordance with another preferred embodiment of the present invention.
Figure 5:
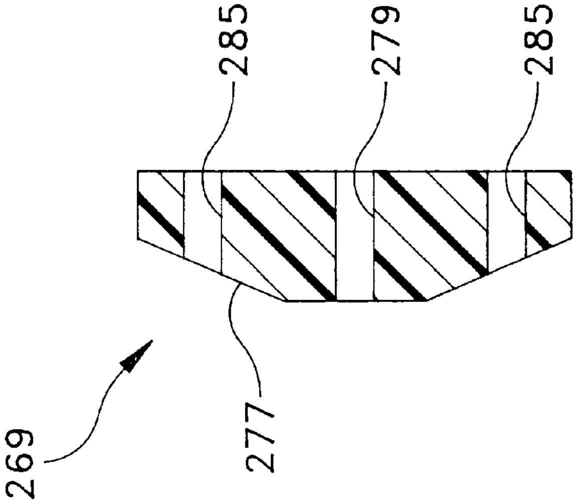
FIG. 5 is a cross-sectional view of the preferred deflector, as taken along lines 5—5 in FIG. 4.
Figure 4:
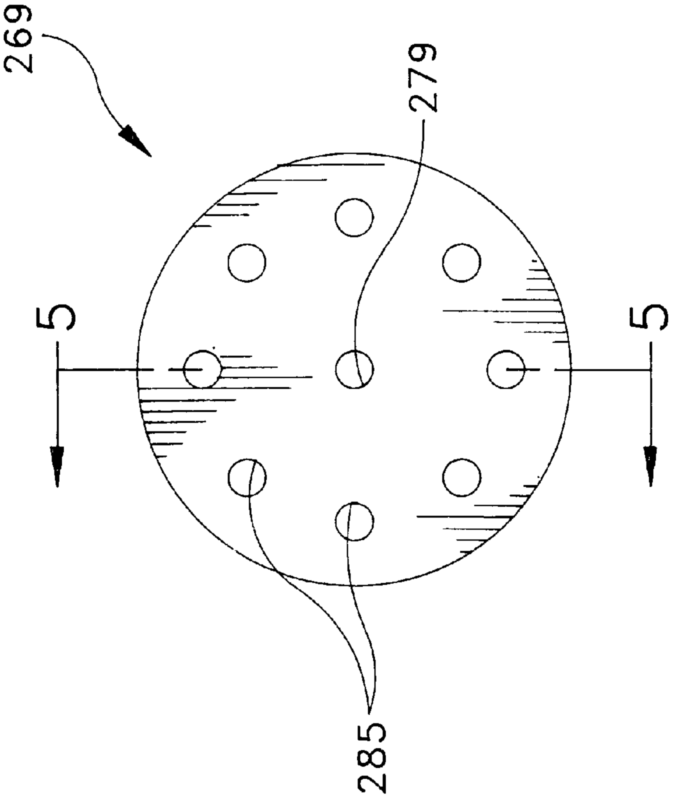
FIG. 4 is a front elevational view of a preferred deflector formed in accordance with the present invention.

Conductive rod 267 extends throughout the length of nozzle 220, with distal end 275 projecting outwardly from opening 257. A deflector 269 is removably fastened to distal end 275 of conductive rod 267, and preferably comprises a circular disk of polymer or the like having angled deflecting surfaces 277 and a central mounting bore 279 (FIGS. 1–3). Preferably, deflector 269 further comprises a plurality of spray bores 285 (FIGS. 4 and 5). Central bore 279 is sized to fit snugly onto distal end 275 of conductive rod 267. Angled deflecting surfaces 277 are arranged to cause charged and air entrained powder to deflect radially outwardly relative to conductive rod 267, during operation of powder application gun 5, as disclosed below in further detail. Spray bores 285 are defined in angled deflecting surfaces 277 and through deflector 269, and are circumferentially arranged. Spray bores 285 preferably comprise a diameter of about 0.125 inches or so. Spray bores 285 preferably comprise a circular shape, although other shapes (oval, square, parallelogram, multi-sided, etc.) may also be employed with equal effect. It will be understood that deflector 269 may have any number of spray bores 285 consistent with the structural integrity of deflector 269, or deflector 269 may be used without spray bores 285 in a less preferred embodiment of the invention. Although, in FIG. 4, spray bores 285 are shown in a circular pattern that is radially uniformly spaced from central mounting bore 279, other patterns of spray bores 285 may be used in connection with the present invention. Spray bores 285 provide for a more uniform application of powder during the spraying operation, especially when powder application gun 5 is used to coat large surfaces. Spray bores 285 also enhance the efficiency of gun 5. It should also be understood that a "perforated" deflector 269 is effective when used in combination with any of the prior art powder coating apparatus exemplified in the prior art patents listed hereinabove.

Still referring to FIGS. 1 and 2, powder container assembly 300 comprises a cup 310, a lid 320, a discharge tube 330, and a pick-up tube 340. According to this example, cup 310 comprises a substantially cylindrical container having a threaded open end 345 and a closed end 350. Lid 320 has a flat top 353 and an annular, threaded flange 355 extending from its perimeter to mate with threaded open end 345 of cup 310. Two bores are defined through flat lid 320. One bore is sized and shaped to receive discharge tube 330 and the other bore is sized and shaped to receive pick-up tube 340. Cup 310 is sized to receive approximately one pound of finely divided coating powder.

According to certain inventive aspects, handle assembly 100, barrel assembly 200 and powder container assembly 300 are assembled in the following manner. Handle assembly 100 first is oriented to position orifice tube 140 in confronting coaxial-relation with the portion of first passageway 239 that opens onto proximal end 233 of transfer tube 210. Handle assembly 100 is moved toward proximal end 233 until orifice tube 140 is snugly received within first passageway 239. Handle assembly 100 is sealingly fastened to transfer tube 210 by means known in the art such as threads, fasteners, adhesives or the like.

Next, sleeve 265 is positioned within second passageway 243 of transfer tube 210. More particularly, proximal end 273 of conductive rod 267 is first altered to form a substantially Z-shaped profile having two substantially right angle bends. Cable 270 is electrically and mechanically fastened to proximal end 273 by soldering, crimping or by other known interconnection means. Distal end 275 of conductive rod 267 is then inserted into a side hole 266 disposed in sleeve 265 until a first right angle bend is disposed within sleeve 265. In this position, distal end 275 is coaxial with the longitudinal axis of sleeve 265. The free end of cable 270 is threaded through cable conduit 241, from distal end 235, so that it extends outwardly from proximal end 233 of transfer tube 210. Sleeve 265 is then slid into the open end of second passageway 243, and cable 270 is pulled through cable conduit 241, until proximal end 273 of conductive rod 267 is disposed within cable conduit 241.

Nozzle 220 is assembled to transfer tube 210 and emitter assembly 230. More particularly, nozzle 220 is oriented so that proximal end 245 is disposed in coaxial confronting-relation with distal end 275 of conductive rod 267. Nozzle 220 is then moved toward conductive rod 267 and slips over conductive rod 267 in coaxial-relation thereto. Nozzle 220 is moved toward transfer tube 210 until the distal portion of sleeve 265 enters smaller diameter section 253 of central passageway 249. In this position, nozzle 220 is fastened to transfer tube 210 by any suitable connection technique, such as by threads, twist-to-lock, adhesives or other mechanical connection structures that permit later disassembly.

Three members 259 (preferably discrete tubes of PTFE) are slid into opening 257 of nozzle 220 so as to be fully disposed within discharge chamber 255. In this arrangement, conductive rod 267 is substantially centrally disposed between members 259, and passes between the three members or tubes. In the alternative, conductive rod 267 can pass through one of the three members. Powder deflector 269 is removably fastened to distal end 275 of conductive rod 267. Perforated powder deflector 269 is oriented so that central bore 279 is disposed in coaxial confronting-relation with distal end 275 of conductive rod 267. In this position angled deflecting surfaces 277 are disposed in confronting-relation with opening 257 of nozzle 220. Perforated deflector 269 is then moved toward nozzle 220 until distal end 275 of conductive rod 267 enters central bore 279. Distal end 275 of conductive rod 267 extends through central bore 279 so as to project outwardly from perforated deflector 269 by about one-eighth to one-half inch. Perforated deflector 269 is releasably fixed to conductive rod 267, for example being simply frictionally affixed.

Powder container assembly 300 is affixed to the preceding assembly as follows. Lid 320 is oriented so that flat top 353 is disposed in confronting relationship with recessed side portion 237 of transfer tube 210. Lid 320 is moved toward transfer tube 210 until flat top 353 engages transfer tube 210. Lid 320 is then oriented, relative to transfer tube 210, so that one of its two bores is positioned in aligned coaxial-relation with the portion of first passageway 239 that opens onto recessed side portion 237. In this position, the other bore is also disposed in aligned coaxial-relation with the portion of second passageway 243 that opens onto recessed side portion 237. Lid 320 is then releasably fastened to transfer tube 210 by fastening means, such as a screw and washer system 370.

Once lid 320 has been fastened to transfer tube 210, discharge tube 330 is positioned in its bore and a portion of first passageway 239 and pick-up tube 340 is positioned within its bore and a lower portion of second passageway 243 of transfer tube 210. It will be noted that discharge tube 330 is relatively longer than pick-up tube 340 so that the free end of discharge tube 330 extends substantially through cup 310, and has its open free end disposed adjacent to the inner surface of closed end 350. This arrangement provides for the thorough fluidization of the powder within cup 310 during operation of powder application gun 5.

Once cup 310 has been filled with a finely divided coating powder, cup 310 is oriented so that discharge tube 330 and pick-up tube 340 are disposed within threaded open end 345. Cup 310 is then moved toward lid 320 until threaded flange 355 engages the edge of threaded open end 345. Cup 310 is then rotated so as to cause lid 320 to threadingly engage threaded open end 345 of cup 310 and thereby releasably fasten cup 310 to transfer tube 210. Cup 310 may be removed and refilled as many times as is necessary.

Powder application gun 5 is operated as follows. Handle assembly 100 is connected to a source of pressurized air in the range from about five to about twelve psi. Air valve 120 is opened, by actuating trigger 130 in this manually operated embodiment, producing a flow of air toward the discharge chamber 255. Pressurized air flows through orifice tube 140, into first passageway 239, through discharge tube 330 and into the interior of cup 310. The air flow fluidizes the powder into a turbulent cloud of particles in cup 310. A portion of the fluidized powder is forced through pick-up tube 340 and into second passageway 243 of transfer tube 210. The fluidized powder travels through second passageway 243 and enters central passageway 249 of nozzle 220. Once within central passageway 249 of nozzle 220, a portion of the fluidized powder interacts with the inner surface of discharge chamber 255, becoming frictionally charged through the triboelectric effect. At the same time, another portion of the fluidized powder flows through and around each discrete member 259 where that portion of the fluidized powder is also charged by the triboelectric effect.

Advantageously, powders comprising a tendency to triboelectrically charge either negatively or positively may be used with the present invention, since contact surfaces having a tendency to charge powder negatively (PTFE) and contact surfaces having a tendency to charge powder positively (nylon) are present in discharge chamber 255. It will also be understood that powder exiting opening 257 of nozzle 220 may be either positively or negatively charged as a result of its transit through central passageway 249 of nozzle 220. Of course, it will be understood that nozzle 220 may be formed from PTFE or the like and members 259 may be formed from nylon or the like.

The powder flows through nozzle 220 and through and around discrete members 259 and then exits opening 257 of nozzle 220. The finely divided powder is first triboelectrically charged during its transit through central passageway 249 of nozzle 220 and then may be given a charging boost, via a corona discharge from distal end 275 of conductive rod 267. More particularly, as the charged powder exits opening 257 it comes into contact with deflector 269 and (i) is deflected radially outwardly so as to form a broad spray of electrically charged powder, and (ii) passes through spray bores 285 directly onto the surface being coated with powder. It will be understood that emitter assembly 230 may be electrically connected to power source 271 to form a corona discharge at distal end 275 of conductive rod 267. The invention has been found to provide effective powder coating of an intricately shaped work piece when emitter assembly 230 is energized in the range from about 8 kV to about 20 kV. A further effective range of voltages may be found between 20 kV and about 60 kV as well.

The need for discharging a build up of charge on the contact surfaces of powder application gun 5 is greatly reduced or eliminated by placing discrete members 259 within discharge chamber 255. Also, in some applications it is not necessary to provide a discrete ground wire in order to electrically ground the work piece during coating.

Powder application gun 5 can be used without the application of electric potential or corona discharge. Referring to FIG. 3, a powder application gun 5 is shown in which no corona discharge is provided. In this embodiment, transfer tube 210 does not include a cable conduit 241 and barrel assembly 200 does not include an emitter assembly 230. In other respects, the powder application gun shown in FIG. 3 is substantially the same as that shown in FIG. 2. Proximal end 473 of a rod 467 is merely embedded in an inner portion of transfer tube 210. Rod 467 simply provides structural support for perforated deflector 269. The assembly and operation of this embodiment of the invention follows that of the electrified embodiment previously described. It will also be apparent that the embodiment shown in FIG. 2 can be operated without the application of electrical potential, by merely disengaging power source 271.

Corona discharge provides an added electrical charge to the powder particles as they transit the gun toward the work piece. This promotes increase powder transfer efficiency (i.e., the ratio of powder sprayed verses the powder adhered to workpiece). However, the users may find it desirable use the non-electrified embodiment of the invention for safety reasons and/or in order to simplify setup time at a sacrifice of transfer efficiency.

Advantages of the Invention

A number of advantages are obtained according to the subject invention. A powder application gun is provided which can be operated at lower potential or no applied potential, as well as at reasonable air pressure and flow rate, effectively achieving triboelectric charging without the problems associated with prior art devices as discussed above.

The powder application gun utilizes a convenient fluidized cup design that is fixed to the gun barrel for dispensing fluidized powder, entrained in a gas. This arrangement enhances portability and allows for quicker change of powder type and color. The powder application gun utilizes air pressure as low as about five to about twelve psi. At this pressure, dry clean air is directed through the transfer tube and discharge tube into a fluidizing cup filled with powder coating and through a discharge passage comprising materials that have either or both of a tendency to triboelectrically charge negatively and positively, achieving effective powder coating by electrostatic attraction.

The invention is not limited to the precise constructions herein disclosed and shown in the drawings as examples, and also encompasses such modifications and equivalents that are met by the appended claims.

What is claimed is:

1. A method for electrostatic spraying of a powder onto a work piece having a broad surface to form a coating comprising the steps of:

(A) providing a gun for spraying a powder onto a work piece to form a coating, said gun comprising:

a handle grip including a trigger actuated air valve;

a powder container disposed in fluid communication with said air valve wherein said powder is fluidized by air from said source of pressurized air when said valve is actuated;

a nozzle having a first end through which said fluidized powder is introduced into a central passageway and a second end through which said fluidized powder emerges, said central passageway having at least one charging surface therein made of a first electrically insulated material suitable for electrically charging said powder by friction;

a plurality of discrete tubes disposed within said central passageway, but separate from said central passageway and having at least one charging surface thereon made of a second electrically insulated material suitable for electrically charging said powder by friction;

a rod disposed within said flow path and projecting outwardly from said opening and having a distal end; and a deflector removably fastened to said distal end of said rod and comprising a disk having a plurality of bores defined therethrough; and (B) spraying said work piece with powder from said gun.

2. Apparatus for spraying a powder onto a work piece to form a coating comprising:

means for manipulating and for controlling a flow of air from a pressurized source through said apparatus;

a container disposed in fluid communication with said means for manipulating and controlling, wherein said powder is held and fluidized by the flow of air from said pressurized source;

means for defining a flow path for said powder having an exit opening, said powder container arranged in fluid communication with said flow path;

means for imparting a net electrical charge of a polarity opposite to that of said work piece to said powder when said powder flows through said flow path during said spraying;

a rod disposed within said flow path and projecting outwardly from said exit opening and having a distal end; and a deflector removably fastened to said distal end of said rod and comprising a disk having a plurality of bores defined therethrough.

3. A gun for spraying a powder onto a work piece to form a coating, said gun comprising:

a handle grip including an air valve coupleable to a source of pressurized air;

a powder container disposed in fluid communication with said air valve wherein said powder is fluidized by air from said source of pressurized air when said valve is opened;

a nozzle having an internal surface defining a central passageway having an open end and disposed in fluid communication with said powder container, said internal surface frictionally imparting a net electrical charge of a first polarity to a first portion of said powder when said first portion of said powder contacts said surface during said spraying;

a plurality of discrete tubes disposed within said central passageway and capable of imparting a net electrical charge of a second polarity to a second portion of said powder when said second portion of said powder contacts said tubes during said spraying;

a rod disposed within said flow path and projecting outwardly from said opening and having a distal end; and a deflector removably fastened to said distal end of said rod and comprising a perforated disk.

4. Apparatus according to claim 3 wherein said deflector includes an angled deflecting surfaces arranged so as to face said opening and thereby cause charged and air entrained powder to deflect radially outwardly relative to said rod during operation of said gun.

5. Apparatus according to claim 3 wherein air released into said central passageway from said powder container flows through and around said tubes and at least a portion of said air flows through said perforated disk.

6. Apparatus according to claim 3 wherein each of said tubes is mutually separate from adjacent ones of said tubes and all of said plurality of tubes are separate from said nozzle.

7. Apparatus according to claim 3 wherein said nozzle is formed from an insulating material having a tendency to charge said powder negatively.

8. Apparatus according to claim 7 wherein each of said plurality of tubes is formed from an insulating material having a tendency to charge said powder positively.

9. Apparatus according to claim 8 wherein said nozzle comprises polyamide and said tubes comprise polytetrafluoroethylene.

10. Apparatus according to claim 3 wherein said nozzle is formed from an insulating material having a tendency to charge said powder positively.

11. Apparatus according to claim 10 wherein each of said plurality of tubes is formed from an insulating material having a tendency to charge said powder negatively.

12. Apparatus according to claim 11 wherein said nozzle is formed from polytetrafluoroethylene and said tubes are formed from polyamide.

13. Apparatus according to claim 3 further comprising means for providing a corona discharge adjacent to said open end of said nozzle.

14. Apparatus according to claim 13 wherein said means for providing a corona discharge comprises an emitter assembly having a tubular sleeve disposed within said central passageway and adapted to support said rod in substantially coaxial relation to said central passageway, said rod being conductive and comprising a proximal end and said distal end wherein said proximal end is positioned through a side bore in said sleeve and is interconnected to a source of electrical potential.

15. Apparatus according to claim 14 wherein said source provides a predetermined electrical potential in the range from about 1 kV to about 30 kV.

16. Apparatus according to claim 14 wherein said source provides a predetermined electrical potential in the range from about 8 kV to about 20 kV.

17. Apparatus according to claim 3 wherein said powder container is coupled to at least one of the handle grip and the nozzle.

18. Apparatus according to claim 3 wherein said source of pressurized air provides pressurized air in the range from about 5 psi to about 12 psi.

19. A gun for spraying a powder onto a work piece to form a coating, said gun comprising:

a base including an air valve;

a powder container disposed in fluid communication with said air valve wherein said powder is fluidized by air from said source of pressurized air when said valve is actuated;

a nozzle having a first end through which said fluidized powder is introduced into a passageway and a second end through which said fluidized powder emerges, said passageway having at least one charging surface therein made of a first electrically insulated material suitable for electrically charging said powder by friction; and, a plurality of discrete tubes disposed within said central passageway, but separate from said central passageway and having at least one charging surface thereon made of a second electrically insulated material suitable for electrically charging said powder by friction;

a rod disposed within said flow path and projecting outwardly from said opening and having a distal end; and a deflector removably fastened to said distal end of said rod and comprising a disk having a plurality of bores defined therethrough.

20. A gun for spraying a powder onto a work piece to form a coating, said gun comprising:

means for manipulating said gun and for controlling a flow of air from a pressurized source through said gun;

a container disposed in fluid communication with said means for manipulating and controlling, wherein said powder is held and fluidized by the flow of air from said pressurized source;

means for defining a flow path through said gun, having an open end, said powder container being releasably fastened to said gun in fluid communication with said flow path, and said means for defining a flow path frictionally imparting a net electrical charge of a first polarity to a first portion of said powder when said first portion of said powder contacts said flow path defining means during said spraying; and, means within said flow path for imparting a net electrical charge of a second polarity to a second portion of said powder when said second portion of said powder contacts said second polarity charge imparting means during said spraying;

a rod disposed within said flow path and projecting outwardly from said opening and having a distal end; and a deflector removably fastened to said distal end of said rod and comprising a disk having a plurality of bores defined therethrough.

* * * * *